3,309,313
HIGH-TEMPERATURE LUBRICATING
COMPOSITION
Francis J. Callahan, Jr., Chagrin Falls, Ohio, assignor to Kenmore Research Company, Framingham, Mass., a corporation of Ohio
No Drawing. Filed Aug. 23, 1961, Ser. No. 133,311
8 Claims. (Cl. 252—26)

This invention relates to high-temperature anti-friction compositions and more specifically to a high-temperature anti-friction composition for stainless steel or other metal alloys which may be subjected to temperatures ranging from about 500° F. to 2400° F. Still more specifically, it relates to anti-friction compositions which may be used on closely fitted parts, such as pipe threads, keyways, or the like, to prevent seizing, galling, and stripping.

The lubrication of closely-fitted metal parts, such as those made from stainless steel or the like, is a difficult problem, particularly when these parts are subjected to high temperatures and pressures. A frozen or tightly-gripped joint, for example, is usually the result of a pipe thread which has been subjected to high take-up pressures without proper lubrication. In such case, there is a tendency for the threads to weld and gall at the interface, making it almost impossible to disassemble the joint. Separation of this joint is even more difficult in instances where it is subjected to high temperatures.

It is understood that the surface of machined parts, such as pipe threads, have projections or asperities thereon, and as two threaded parts slide over one another these asperities tend to weld to each other as the interface pressures increase. After initial welding at the surface, further movement tends to tear these asperities out of one of the surfaces. This tearing generates an instantaneous surface temperature which is of the order of several-thousand degrees Fahrenheit. As a result, there is a point-to-point melting of the asperate surfaces. In addition, of course, virgin metal is left on one of the surfaces, which means that there is no oxide layer on that surface. The cohesive force of this virgin metal surface is of a very high magnitude and it is this which is the main source of surface friction. It also is understood that when the surfaces of two machined parts move over each other, only the peaks of the asperities and not the whole surface weld together, since it is the peaks of the asperities that make complete contact. This results in a gradual attrition of the level of the asperities which means that the surfaces are gradually wearing smoother.

Accordingly, it is an object of this invention to provide a high-temperature anti-friction composition.

It is another object of this invention to provide a high-temperature anti-galling thread lubricant and a method of preparing same.

It is still another object of this invention to provide a water-resistant anti-galling thread lubricant.

These and other objects will become apparent from a further and more detailed description of the invention.

It has been discovered that an improved high-temperature anti-friction composition can be prepared by gelling an oleaginous liquid to a grease consistency with an organophilic bentonite, said composition also containing silver flakes, metal oxide, and talc. More specifically, it has been discovered that an improved anti-galling thread lubricant can be prepared by gelling a lubricating oil to a grease consistency with about 1 to 10 percent by weight of an organophilic bentonite, said lubricant also containing about 10 to 30 percent by weight of silver flakes, 1 to 20 percent by weight of metal oxide, and about 1 to 10 percent by weight of talc.

As described above, through diffusion caused by high pressures and high temperatures, there is bound to be asperate welding which results in exposure of virgin metal surfaces. The composition of this invention, however, contain materials that will cover these virgin surfaces when exposed by disengagement of the fitted parts. For example, silver flakes and magnesium oxide serve to reduce welding of the newly exposed or virgin surfaces. In addition, this anti-galling composition serves to reduce diffusion of the metal layers within one another. This effort to slow down surface diffusion at high temperatures and pressures can be accomplished by interpositioning a metal particle foreign to the surfaces. In any diffusion reaction, there is an exchange of atomic positions, i.e. the atoms go from one layer to another layer, and the direction of diffusion depends on several variables. Thus, this exchange results in a gradual welding of the metal surfaces. However, if a layer of foreign metal is placed between the surfaces, i.e a barrier layer, this would then slow down the diffusion, which, in turn, would decrease the amount of welding. It is essential that this barrier layer have a slow rate of diffusion in the metal surfaces. With the lapse of time, or as a result of high temperatures, the barrier layer eventually may contain atoms from the layers of metal.

In providing a barrier layer, it has been discovered that silver is one of the best metals available because of its low diffusion rate into ferrous metals and because of its immiscibility with molten stainless at the asperate point. It also was discovered that silver itself serves as a lubricant on the take-up of the threads because it not only has a low shear stress value but also because the silver particles are themselves in the form of flakes which tend to slide over each other. However, once welding of the threaded parts occurs, due to temperatures of about 1900° F. to 2500° F., there is the task of breaking this bond. A metal such as silver, because of its low shear stress, lends itself to this task. In practice, for example, there are many instances when a threaded part is used at a temperature where welding will occur. This threaded part then is returned to room temperature and the bond set up by diffusion and oxidation due to the thermal exchange at high temperatures must be broken. An anti-galling composition which contains a metal of low shear strength, such as silver, will facilitate this problem.

In preparing the high-temperature anti-friction compositions of this invention, any of the oleaginous lubricating fluids may be used as the base oil. Mineral lubricating oils having a viscosity of about 50 to 4,000 S.S.U. at 100° F., or blends of oils having suitable viscosities may be employed. In addition to petroleum oils, other operable oils are the synthetic oils, such as the phosphate esters, dicarboxylic acid esters, silicones, etc. Animal and vegetable oils can be employed also; these include, for example, lard oil, sperm oil, and particularly castor oil. A variety of lubricating oils are suitable for the present purpose and any well-known lubricant can be employed in the preparation of this composition. Of these oils, castor oil is preferred particularly because of its high pressure properties.

The lubricating fluid may range from about 30 to 90 percent by weight of the total composition, and preferably from about 50 to 70 percent by weight of the composition. These lubricating fluids are thickened to a thixotropic gel by the addition of about 1 to 25 percent by weight, and preferably from about 1 to 10 percent by weight, of an organophilic bentonite clay. The organic-modified bentonite clays are prepared by reacting bentonite with about 1 to 20 percent by weight of the clay of an organophilic constituent, such as an amine. The organophilic bentonite is formed by replacing the exchangeable inorganic cation of the bentonite with an organic anion to form the salts, such as the hydrochlorides of aliphatic, cyclic, aromatic and heterocyclic amines, which may be primary, secondary, or tertiary amines and polyamines, and quaternary ammonium compounds, such as dimethyl dicetyl ammonium hydroxide. Of these, the preferred organophilic clay is dimethyl dicetyl ammonium bentonite, commercially known as "Bentone 34." A complete disclosure of these organophilic bentonites may be found in U.S. Patent 2,531,427 issued to E. A. Houser.

In some instances, for example, when using short or single chain aliphatic amine bentonite compounds, dispersion of the organic bentonite in the oil can be facilitated by the use of 1 to 3 percent by weight of the bentonite of a solvating agent. These agents may include alcohols, ethers, ketones, and especially ethyl acetate, acetone, and methyl alcohol.

Suspended in this thixotropic gel is approximately 10 to 40 percent, preferably 20 to 30 percent by weight of the composition of silver flakes. These flakes have a particle size that will pass through a 200 mesh standard screen. In combination with the silver flakes, there is suspended approximately 1 to 20 percent by weight of the composition of a metal oxide, such as powdered aluminum or magnesium oxide. In addition to the silver flakes and metal oxide, there is also suspended approximately 1 to 10 percent by weight of the composition of talc. This talc is essentially a hydrated magnesium-silicate having a Moh's hardness of about 1.0–1.3 and a particle size of about 200 to 400 microns.

The purpose of employing a non-melting thixotropic gel composition with silver flakes, magnesium oxide, and talc is to make sure that the fitted parts are protected from galling when the bond is severed in the disengagement of such parts, as in the case of pipe threads. The surfaces of these fitted parts must be lubricated so as to prevent galling which results from high pressures and temperatures, i.e. ranging from about 500° F. to 2300° F. Normal greases or oils would tend to flow out and carry the silver particles and other materials with them, but here the nonmelting thixotropic composition is not affected by heat and the result is that it is boiled dry in situ, leaving the silver flakes, magnesium oxide, and talc in position. The thixotropic gel or lubricant also functions to hold the inorganic constituents in suspension over a long period of time, thus giving the thixotropic gel composition a good shelf life.

As described above, an advantage in using silver flakes in the anti-galling thread lubricant is that silver melts and has a very low shear stress value. This accounts for the ease with which the threaded parts can be disengaged. It is desirable then to have components in the composition that will break easily and start to flow. For example, when threaded parts which are lubricated with a thixotropic gel containing only silver are heated to high temperatures, i.e. 2100° F., the gel is destroyed leaving behind a residue of the gel and silver particles on the threads. Thus, oxides which would ordinarily form on the metal surfaces at these temperatures are restricted in their growth by the residue of the gel and silver. In practice, however, this residue is not sufficient and it has now been discovered that an additional amount of material, such as magnesium oxide, may be used to inhibit such oxide formation. Any oxides which might now form on the metal surfaces must push before them silver and magnesium oxide so that they never grow together but instead grow around the silver and magnesium oxide, forming a layer which is more easily fractured during the disengagement of the threaded parts. Here the primary purpose of magnesium oxide is to make the metal oxides, which are usually formed on the threaded surfaces at these temperatures, easier to rupture. Magnesium oxide has a low bulk density and thus lowers the shear stress of oxides that might bind the threads together. In this respect, it is particularly desirable to use precipitated magnesium oxide which has a very low bulk density. It also serves as a barrier to any inter-diffusion between the threaded parts.

When these threaded parts, such as pipe threads or keyways are heated, the oxides formed on the metal, e.g. iron, nickel, titanium, and chromium, etc., are more easily broken if they contain magnesium oxide.

The effectiveness of magnesium oxide in the high temperature composition is particularly noticed at temperatures ranging from about 1200° F. to 1500° F., since at higher temperatures, e.g., 2300° F., a sufficient amount of oxide is formed on the metal surface such that it is capable of being ruptured to permit disengagement of the threads. In some instances, however, there is insufficient clearance between the tightly fitted parts to allow for the existence of a sufficient amount of magnesium oxide. Thus, to provide sufficient clearance between the threaded parts, the high temperature composition of this invention also must contain talc as a spacer element. It has now been discovered that talc having a particle size of about 200–350 microns, is particularly effective for this purpose. Talc, which is essentially a hydrated magnesium silicate, is an exfoliated substance which will expand at higher temperatures and thus facilitate the incorporation of magnesium oxide and silver flakes between the tightly-fitted parts. Not only is talc an ideal spacer element because of its exfoliated properties, but also because it is in itself a solid lubricant which improves the present composition's effectiveness at high temperatures.

It was discovered particularly that when talc was used in combination with silver flakes and magnesium oxide the normally required breakaway torque was considerably decreased and there was essentially no scoring of the metal surfaces.

Illustrations of the high-temperature anti-friction compositions of this invention are as follows:

*Example 1*

| | Parts by wt. |
|---|---|
| Mineral oil | 53 |
| Acetone | 1.5 |
| "Bentone 34" (dimethyl dicetyl ammonium bentonite) | 6 |
| Talc (hydrated magnesium silicate) | 7 |
| Magnesium oxide (powdered) | 3.5 |
| Silver flakes (200 mesh) | 29 |

*Example 2*

| | |
|---|---|
| Dicarboxylic acid ester oil | 55 |
| Dimethyl dicetyl ammonium bentonite | 6 |
| Talc | 7 |
| Magnesium oxide | 3 |
| Silver flakes | 29 |

*Example 3*

| | |
|---|---|
| Castor oil | 60 |
| Dimethyl dicetyl ammonium bentonite | 10 |
| Talc (300 microns) | 10 |
| Magnesium oxide (powdered) | 5 |
| Silver flakes (200 mesh) | 15 |

*Example 4*

| | |
|---|---|
| Sperm oil | 40 |
| Quaternary ammonium bentonite | 10 |
| Acetone | 1 |
| Talc | 7 |
| Magnesium oxide | 12 |
| Silver flakes | 30 |

*Example 5*

| | |
|---|---|
| Silicone lubricating fluid | 50 |
| Dimethyl dicetyl ammonium bentonite | 10 |
| Talc | 4 |
| Magnesium oxide | 20 |
| Silver flakes | 16 |

*Example 6*

| | Parts by wt. |
|---|---|
| Castor oil | 45 to 60 |
| Dimethyl dicetyl ammonium bentonite | 4 to 8 |
| Talc (250–350 microns) | 2 to 9 |
| Magnesium oxide (powdered) | 2 to 5 |
| Silver flakes (200 mesh) | 25 to 35 |
| Acetone | 1 to 2 |

The high-temperature anti-friction compositions of this invention can be prepared by gelling the base oil with the gelling agent and then adding talc, magnesium oxide, and silver flakes. The order in which the ingredients are added to the gel is not critical. It is important, however, that each ingredient be added in the proportion that imparts to the composition the desired high temperature characteristics. These characteristics are for the most part the effectiveness of the composition to aid in sealing the tightly fitted parts and still permit the easy removal of these parts after they have been subjected to relatively high temperatures.

While this invention has been described with reference to specific examples, it is to be understood that the invention is not intended to be limited to such examples, except as recited hereinafter in the appended claims.

What is claimed is:

1. A high temperature anti-friction composition consisting essentially of a lubricating oil thickened to a gel with an organophilic bentonite clay and containing from about 10 to 40 percent by weight of silver flakes, 1 to 20 percent by weight of a metal oxide selected from the group consisting of magnesium oxide and aluminum oxide, and 1 to 10 percent by weight of powdered talc.

2. The composition of claim 1, further characterized in that the lubricating oil is mineral oil.

3. The composition of claim 2, further characterized in that it contains a dispersing proportion of acetone.

4. A high temperature anti-galling composition consisting essentially of castor oil gelled with an organophilic bentonite clay and containing from about 10 to 40 percent by weight of silver flakes, 1 to 20 percent by weight of magnesium oxide, and 1 to 10 percent by weight of powdered talc.

5. The anti-galling composition of claim 4, further characterized in that the silver flakes are of a particle size that will pass through a 200 mesh screen.

6. The anti-galling composition of claim 4, further characterized in that the organophilic bentonite clay comprises from 1 to 25 percent by weight of the composition.

7. A high-temperature anti-friction composition consisting essentially of 30 to 90 percent by weight of castor oil, 1 to 10 percent by weight of an organophilic bentonite clay, 25 to 35 percent by weight of silver flakes, 1 to 20 percent by weight of powdered magnesium oxide, 1 to 10 percent by weight of powdered talc, and 1 to 3 percent by weight of acetone.

8. The composition of claim 7, further characterized in that the talc has a particle size of about 250 to 350 microns.

References Cited by the Examiner

UNITED STATES PATENTS

| 2,012,952 | 9/1935 | Brinker et al. | 252—378 |
| 2,108,577 | 2/1938 | Brough | 252—378 |
| 2,321,203 | 6/1943 | Henry | 252—26 |
| 2,444,271 | 6/1948 | Smith | 252—28 |
| 2,581,407 | 1/1952 | Hain | 252—28 |
| 2,833,720 | 5/1958 | Stratton | 252—28 |
| 3,007,867 | 11/1961 | Allen et al. | 252—26 |

OTHER REFERENCES

"Industrial Minerals and Rocks," second edition, The American Institute of Mining and Metallurgical Engineers, New York, 1949, page 1020.

"Notes on Constitution of Steatite" by Thurnauer and Rodriguez in American Ceramic Society Journal, vol. 25, No. 15, 1941–1942, pages 443, 444, and 450.

"The Colloid Chemistry of Silica and Silicates" by Iler, Cornell University Press, New York, 1955, page 191.

DANIEL E. WYMAN, *Primary Examiner.*

JOSEPH R. LIBERMAN, I. VAUGHN,
*Assistant Examiners.*